Inventor:
Jean-Jacques Laupretre
BY Baldwin & Wight
Attorneys

Inventor:
Jean-Jacques Laupretre
BY Baldwin & Wight
Attorneys 3,421,022

SIGNALLING CIRCUIT ARRANGEMENT

Jean-Jacques Laupretre, Perreux-sur-Marne, Val-de-Marne, France, assignor to Societe Industrielle Bull-General Electric (Societe Anonyme), Paris, France Filed Sept. 17, 1965, Ser. No. 487,991
Claims priority, application France, Oct. 19, 1964, 991,901
U.S. Cl. 307—235 10 Claims
Int. Cl. H03k 5/20

ABSTRACT OF THE DISCLOSURE

A circuit arrangement which is adapted to detect and store an input signal received at an input terminal, which signal has a relatively long rising front edge and is not synchronized with respect to clock pulses received at another input terminal. A threshold trigger circuit, including a tunnel diode, may be triggered in response to a sufficiently long input signal due to the action of an integrating circuit, with the result that parasitic signals shorter than the duration of a clock pulse are ignored by the circuit arrangement.

This invention relates to apparatus capable of detecting and memorising the presence of input signals carrying information, which are not synchronised in relation to a train of clock pulses produced by a generator adapted to operate in the central unit of an information processing apparatus, or to co-operate therewith.

The same problem may also arise in the telecommunications field.

By "input signal to be detected" is meant one of the pulses which may be supplied by various apparatus for reading recordings such as a magnetic tape unit, a magnetic drum, a record card reader, etc. Such an input signal may also form part of a telegraphic message, or it may be extracted from the output of a recirculation store, such as a magnetostrictive delay line, or the like.

In earlier apparatus intended for unifying in time two series of signals which have no synchronous relation with one another, it has already been proposed to effect a number of successive samplings of the input signal by means of a number of logical circuits under the control of one or more clock pulse generators. Such arrangements have generally been incapable of operating at very high repetition frequencies with satisfactory reliability.

When it is necessary to detect a random input signal and a clock pulse generator is available in a central receiving unit, a first stage consists in generating by means of a bistable device a voltage level which characterises the storage of an input signal following upon the sampling effected on an input circuit by means of the said clock pulses. If necessary, a second stage can then consist in emitting a series of rhythmic pulses immediately after an input signal has been detected and stored as indicated above, for example by means of a logical circuit which receives the same clock pulses or pulses derived therefrom.

A first object of the invention is to provide a circuit arrangement as just defined, which is capable of processing input signals whose repetition frequency is much lower than the frequency of the clock pulses employed in a central receiving unit.

A second object of the invention is to provide such a circuit arrangement which solves the aforesaid problems with very high reliability, that is to say, while remaining insensitive to the parasitic signals which might disturb the input channels of the circuits.

Another object of the invention is to provide such a circuit arrangement which utilises only elements of low cost which are easy to employ.

In accordance with the invention, there is provided a circuit arrangement which is capable of detecting and memorising the presence of any unsynchronised signal having a relatively long rising front edge as compared with the period of clock pulses which are supplied by an external source, comprising: a logical AND circuit including diodes and a resistor, with a first input for receiving the signal to be detected and a second input to which the clock pulses are continuously applied; a capacitor of which one plate is connected to the resistor of the AND circuit to form an integrating circuit; a bistable amplifier composed essentially of a tunnel diode and of biasing means in order that, in the low-voltage state, this diode may absorb a current lower than its peak current, and of a transistor whose base-emitter junction is connected in parallel with the electrodes of the tunnel diode, the said transistor being normally non-conductive; and resistive coupling means connected between the other plate of the capacitor and that electrode of the tunnel diode which is connected to the base of the transistor, these means being adapted to supply a current surplus to the tunnel diode in order to cause it to change over to its high-voltage state when the capacitor transmits a pulse derived from the rear edge of a clock pulse, only if the input signal has reached, at the beginning of the said pulse, a predetermined minimum amplitude.

The circuit arranegement may comprise in addition an amplifying device connected to the collector of the said transistor and adapted to supply a voltage level characterising the fact that an input signal has been detected and stored.

The circuit arrangement may further be completed by an AND circuit, of which a first input receives the said clock pulses and of which a second input is controlled by the output of the said amplifier, whereby the output of the AND circuit supplies a train of rhythmic pulses after an input signal has been detected and stored.

Means are provided to restore the detecting-storage device to the inoperative state when its control signal or the rhythmic pulse train has been utilised by the central unit.

It does not appear necessary to dwell on the properties of tunnel diodes, which are now well known. However, details of their characteristics and of their association with a transistor may be found in British patent specification No. 973,343.

For a better understanding of the invention and to show how it may be carried into effect, the same will now be described, by way of example, with reference to the accompanying drawings, in which.

It is known that it is often necessary, in an information-processing system, to ensure unification in time between two series of signals which have no synchronous relation to one another. For example, assuming that a signal read from a magnetic tape has a repetition frequency which is not exactly fixed and which is in any case much lower than the pulse frequency at which the central unit operates, the latter frequency is generally fixed by one or more clock pulse generators.

The circuit arrangement according to the invention has been designed mainly for use in a high-performance information-processing system, that is to say, one in which the central unit operates at a relatively high frequency. In the present case, it will be assumed that this frequency is 8 mc./s., which gives 125 nanoseconds for the duration of a pulse period.

The circuit arrangement just described is designed to detect the presence of each reading signal received at its input, which signal may emanate from apparatus of various natures. Such an apparatus may be a magnetic tape reader and if the signals which it supplies have a mean frequency of 50 kc./s., their period has a duration of 20 microseconds. On the other hand, while each clock pulse may have a fairly well maintained square-wave form, each input pulse received at the input may be more or less trapezoidal, that is to say, each impulse commences with a slope before reaching a certain voltage level. If, in accordance with the above-indicated example, this slope may last 2.5 microseconds, i.e. twenty periods (20 p.) of clock pulses, other input signals may have slopes equivalent only to 10 p., or on the other hand to 100 p., depending upon their origin.

Figure 3:
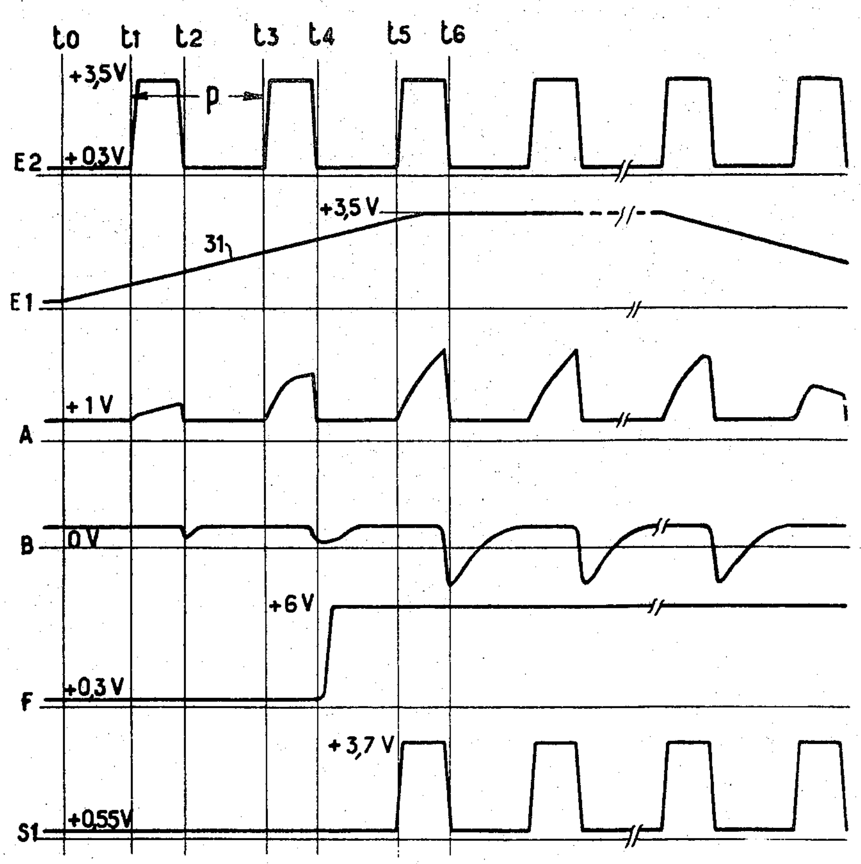
FIGURE 3 is a graph showing the wave forms which may be detected at various points of the circuit arrangement according to FIGURE 1.

There are shown in the graphs of FIGURE 3, on line E2, a series of clock pulses corresponding to a frequency of 8 mc./s. There is shown on the line E1 a pulse of an input signal to be detected and stored. The latter pulse commences with a rise 31, which has been limited to an approximate duration of three periods of duration p. only, in order to limit the width of the figure.

Figure 1:
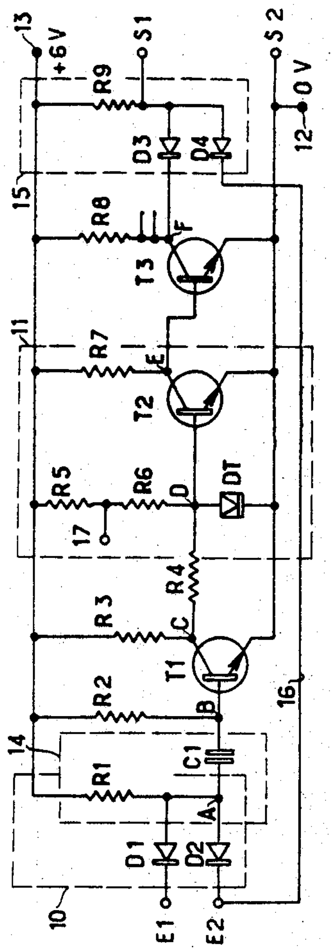
FIGURE 1 is an electric circuit diagram of a circuit arrangement according to the invention.

Reference will now be made to FIGURE 1, which shows a first embodiment of the circuit arrangement according to the invention. The latter comprises at the input a logical circuit 10 composed of two diodes D1 and D2 and of the resistor R1. Since the signals received have positive polarity, and having regard to the orientation of the diodes, the element 10 operates as an AND circuit. The input E2 receives the clock pulses supplied by a pulse generator which has not been shown, since it does not form part of the invention and it may take various known forms.

An important element is shown at 11 in the known form of a bistable amplifier composed essentially of the tunnel diode DT and of the transistor T2. It will be seen that the anode of the diode DT is directly connected to the base of the transistor T2 and that its cathode is directly connected to the emitter of the latter and to a terminal 12, which will be assumed to be connected to the negative pole of a unidirectional-voltage source (not shown). The load impedance of the diode DT is divided into two resistors R5 and R6. One end of the collector resistor R7, as also one end of the resistor R5, is directly connected to the terminal 13, which is assumed to be connected to the positive pole of the said unidirectional-voltage source, which may be of +6 volts, for example.

The connecting capacitor C1 and the resistor R1 have been enclosed in the rectangle 14 to indicate that they form what is called an integrating circuit, although the resistor R1 already forms part of the AND circuit 10.

In this first embodiment, in which high response rapidity is desired, coupling means are provided, which consist of the resistor R4 and of an amplifier comprising the transistor T1 and the resistors R2 and R3. The capacitor C1 is connected between the output A and the AND circuit 10 and the junction point B connected to the base of the transistor T1. An inverting amplifier device consists of the transistor T3, the base of which is directly connected to the collector of the transistor T2, and of the resistor R8. The output AND circuit 15 is composed of the two diodes D3 and D4 and the resistor R9. The cathode of the diode D4 is connected by the conductor 16 to the input terminal E2.

By way of non-limiting example, the following values of the components have been found satisfactory:

| | | |
|---|---|---|
| R1 | ohms | 1,200 |
| R2 | do | 6,800 |
| R3 | do | 820 |
| R4 | do | 470 |
| R5 | do | 220 |
| R6 | do | 560 |
| R7 | do | 1,200 |
| R8 | do | 470 |
| R9 | do | 1,200 |
| C1 | picofarads | 33 |

The transistors employed are of the NPN type. However, the transistors T1 and T3 are silicon-based, for instance of the type 2N744, while the transistor T2 is germanium-based, for example of the type 2N955. The tunnel diode DT, whose peak current is 10 ma., may be of the germanium type 1N3719.

Figure 4:
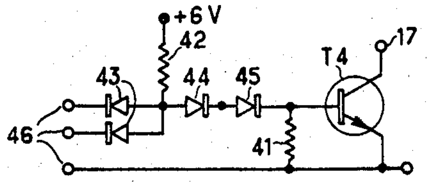
FIGURE 4 is an electric circuit diagram of an apparatus for the return to the quiescent state which may be employed with the circuit arrangement of FIGURE 1.

The terminal 17, which corresponds to the junction point of the resistors R5 and R6, is designed to receive a pulse intended to bring the bistable amplifier 11 to the quiescent state, or non-signal-storing state. In fact, a switch is permanently connected to this terminal 17. The said switch, which is of known construction, is shown in FIGURE 4 and comprises a transistor T4, the resistors 41, 42, and the diodes 43, 44, 45. The terminal 17 is also shown in this figure, which shows that the collector of the transistor T4 is directly connected to the bistable amplifier 11, the operation of the latter being in no way disturbed since the transistor T4 is normally blocked in the non-conducting state.

The quiescent state of the bistable amplifier 11 is characterised by the fact that the tunnel diode DT is in its low-voltage state (D.D.P. lower than 50 mv.). The current flowing through it, which emanates mainly from the resistors R5 and R6, is below the value of its peak current. The transistor T3 is highly conductive by reason of the considerable base current supplied thereto through the resistor R7. The transistor T1 is also conductive at saturation, by reason of the considerable base current supplied thereto by the resistor R2.

It may be considered that when the terminals E1 and E2 receive no pulse, their potential is about +0.3 volt. During each clock pulse received by the input terminal E2, the potential of the latter rises to +3.5 volts. However, the potential of the point A varies only by a negligible amount and the charge of the capacitor C1 may be regarded as remaining at zero. As is known, the potential of the output of an AND circuit such as 10 (point A) can rise substantially above the quiescent voltage only when the two diodes D1 and D2 are simultaneously non-conductive. On the other hand, from the instant when the two diodes are simultaneously rendered non-conductive, the voltage at the point A cannot rise instantaneously, but only as a function of the charge gradually acquired by the capacitor C1, the variation of this voltage being caused to follow an exponential curve form corresponding with the time constant equal approximately to the product R1×C1, the dynamic resistance of the base-emitter junction of the transistor T1 being so low as to be negligible. Therefore, the charge acquired by the capacitor C1 during a clock pulse depends essentially upon the amplitude reached by the input signal at the instant of the front edge of this pulse.

The case will be considered where the input signal has reached a predetermined mean amplitude. From the instant of the front edge of the clock pulse under consideration, the two diodes D1, D2 being non-conductive, the voltage at A rises exponentially until such time as it becomes greater than the momentary voltage of the input signal. From this instant, the voltage at A can only follow the input signal, to within the voltage drop across the diode D1. The capacitor C1 therefore continues to become charged, but at a much lower rate of change, until the end of this clock pulse.

When the diode D2 becomes conductive again at the end of the pulse under consideration, the voltage at the point A suddenly falls to about +1 volt. Since the capacitor C1 cannot discharge instantaneously, a voltage change of negative direction is transmitted to the base of the transistor T1, and if the quantity of electricity then restored by the capacitor C1 is sufficient, the transistor T1 is rapidly rendered non-conductive, which is required in order that an input signal may be detected and stored.

A graphic representation of the above phenomena is shown in FIGURE 3 on the lines E1, E2, A and B during the period of time comprised between the instants *t3* and *t4*, assuming that the rise 31 of the input signal has started at the instant *t0*. It will be seen from line B that as the instant *t4* the voltage of the base of T1 falls below +0.5 volt for a time sufficient for the collector current to be interrupted or at least sufficiently reduced to ensure the change-over of the diode DT.

If the reduction of the collector current of T1 is sufficiently great, a current surplus is supplied through the resistors R3 and R4 to the anode of the diode DT. This current surplus must be such that the total current flowing through the tunnel diode momentarily exceeds 10 ma. The latter is therefore rapidly changed over to its second stable state, or high-voltage state, in which the voltage across its terminals exceeds 450 mv. This voltage is such that a substantial base current is supplied to the transistor T2, whereby the latter is rendered conductive at saturation a little after the instant *t4*. The voltage at the point E becomes so low that the base current of the transistor T3 is interrupted, whereby its collector current is also cut off. From this instant, the diode D3 is rendered non-conductive by biassing in the opposite direction due to the voltage rise at the point F (line F of FIGURE 3). The clock pulses received by the cathode of the diode D4 are then transmitted by the AND circuit 15, and they appear between the output terminals S1, S2 from the instant *t5*.

If the amplitude reached by the input signal at the instant of the front edge of a clock pulse (for example the instant *t1*) is lower than a predetermined threshold value, the charge acquired by the capacitor C1 during the pulse may be so low that the negative pulse thus set up at the end of the clock pulse and received by the base of the transistor T1 at the instant *t2* has an insufficient duration to render the transistor T1 non-conductive since, owing to the high frequency and the duration of the pulses, the capacitances associated with the base and with the collector of the transistor necessitate the supply of a quantity of electricity sufficient to ensure that the collector current is usefully interrupted.

It is obvious that immediately after the bistable amplifier has been triggered to the state in which it stores the input signal, this state is stable and is no longer influenced by the repeated non-conductive states of the transistor T1 which are produced when the input signal has reached its maximum amplitude, that is to say, after the instant *t6*.

It is to be noted that the circuit arrangement could be terminated by the bistable amplifier 11 if the voltage variation of negative sense, which marks the storage of the input signal, could be directly utilised. The amplifier comprising the transistor T3 has been designed to effect a reversal of polarity of the control signal, as also a power amplification. In some applications, this latter control signal, in the present instance a positive voltage level at the point F, could be directly employed. More generally, however, it is desirable to control a number of logical circuits which may be included in the central unit of an information-processing system. The AND circuit 15 shown in FIGURE 1 is only one of these logical circuits.

When the central unit has utilised the control signal or the pulses available at the output of the arrangement, that is to say, when the detected input signal has disappeared, means (not shown) supply to the input terminals 46 of the switch (FIGURE 4) positive signals suitable for rendering the two diodes 43 non-conductive. A base current can then flow through the resistance 42 and the two silicon diodes 44, 45 so as to render the transistor T4 highly conductive. The latter then passes a considerable collector current through the resistors R5 and R6 (FIGURE 1), so that the current flowing through the diode DT becomes lower than its valley current and the conduction of the transistor T2 is interrupted. When this pulse has ended, the diode DT returns to its low-voltage state and the transistor T2 remains non-conductive.

If it is desired that the triggering threshold of the bistable amplifier should be better defined, a minor modification may be made to the described circuits. This modification consists in replacing the resistor R4 by two diodes connected in series and in the same direction, so that the anode of one is connected to the point C and the cathode of the other to the point D. These two silicon diodes may be of the 1N914 or 1N3604 type. When the transistor T1 is saturated, these two diodes are non-conductive and, in the quiescent state, the current flowing through the diode DT is supplied solely by the resistors R5 and R6.

Figure 2:
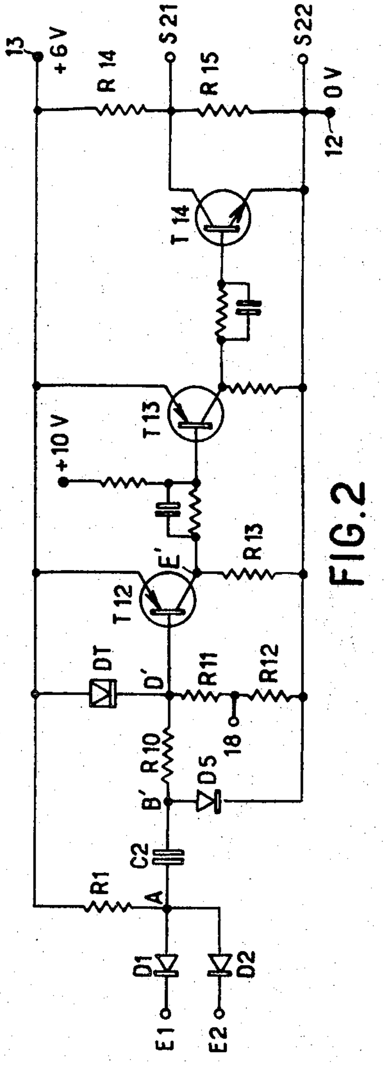
FIGURE 2 is an electric circuit diagram of a second version according to the invention.

A second version of such a circuit arrangement according to the invention is illustrated by the diagram of FIGURE 2. The usefulness of this version is that it shows: a different connection in which the tunnel diode is now inserted on the side of the positive pole of the voltage source, the use of PNP transistors, and resistive coupling means simplified as compared with those of FIGURE 1. On the other hand, this second variant is doubtless incapable of operating correctly at such a high pulse frequency as that previously indicated. Two of the members illustrated in FIGURE 2, which may be identical to two of FIGURE 1, bear the same reference as in FIGURE 1.

In the bistable amplifier comprising the diode DT and the transistor T12, the latter is now of a germanium PNP type. The resistor R13 constituting the load impedance of the transistor T12 may have a value of 390 ohms. Two resistors R11 and R12, each of 470 ohms, are connected in series between the cathode of the diode DT and the terminal 12. The coupling means adapted to supply temporarily a current surplus to the tunnel diode comprise the resistor R10 and the germanium diode D5. The capacitor C2 will be given a capacitance such that the time constant R1×C2 of the integrating circuit is smaller than or equal to the duration of a clock pulse, as in the case of the first variant previously described. The terminal 18, which corresponds to the junction of the resistors R11 and R12, is intended to receive the resetting pulses. In the present case, these may be supplied by a switching circuit including a transistor of the PNP type.

When the bistable amplifier DT–T12 is in the quiescent state, the transistor T12 is non-conductive owing to the fact that the diode DT is in its low-voltage state. It will be seen that, since the diode D5 is biassed in the forward direction, the current of the tunnel diode is defined by the resistance of the two parallel branches R11 and R12 on the one hand, and R10 and D5 on the other hand. If R10 is a resistor of 2000 ohms, the current flowing through DT is 9 ma., of which 2.7 ma. flow through R10 and D5 in series. The voltages at the points A and B′ being substantially equivalent, the capacitor C2 may be regarded as uncharged as long as no input signal is received by the input E1.

When an input signal to be detected is present at the input terminal E1, the capacitor C2 receives a charge during each clock pulse received by the input E2, the diode D5 constituting a low-resistance path for the charging current.

When, at the time of a clock pulse, the rise of the input signal reaches a predetermined amplitude, for example 60% of the maximum amplitude, the capacitor C2 has acquired, at the end of the said clock pulse, a sufficient charge for a negative pulse to be set up at the point B′ at the instant of the rear edge of this clock pulse. At this instant, since the diode D5 is biased in the inverse direction, it becomes non-conductive and the subsequent discharge of the capacitor C2 produces the flow of an increased current through the resistor R10. This current surplus is such that the peak current of the diode DT is momentarily exceeded and the latter is rapidly changed over to its high-voltage state, whereby the transistor T12 is rendered conductive. This results in a higher voltage level being set up at the collector of the transistor T12, that is to say at the point E'.

It has been proposed that the bistable amplifier DT–T12 be followed by a two-stage amplifying device of a type well known in the art. In the first stage, the transistor T13 is of the germanium PNP type and in the second stage the transistor T14 is of the silicon NPN type. The collector of the latter is fed from the junction point of the two resistors R14 and R15, the latter being of such value that when the transistor T14 is non-conductive, the voltage level at the output terminals S21, S22 does not exceed +3.5 volts. The output voltage S21 may be employed to control one or more AND circuits, as illustrated in FIGURE 1.

With the two circuit arrangements just described, the operating reliability is excellent by reason of the very small probability that the bistable amplifier will be triggered at an untimely moment as a result of spurious signals appearing at the input E1. Such spurious signals are generally spurious switching signals whose duration is shorter than the duration of a clock pulse. Even if such a spurious signal reaches an amplitude equal to that of the expected input signal, the integrating effect of the capacitor associated with the resistor R1 normally has the result that the bistable amplifier cannot be triggered if the spurious signal has an appreciably shorter duration than a clock pulse.

In addition, the described circuit arrangement cannot supply at its output S1 or S21 a signal whose duration is shorter than that of a clock pulse. Moreover, the conductive state of the bistable amplifier is very rapidly defined after the end of each clock pulse, in contrast to what would happen with a bistable circuit comprising two transistors, because the latter may assume, when an insufficient signal is received, an unstable state in which the two transistors are conductive, which state may be prolonged and cease only under the influence of random excitations such as spurious signals, thermal noise, etc.

I claim:

1. A circuit arrangement for detecting a relatively slow rising input signal applied to an input terminal comprising:
- an input coincidence circuit with diodes and resistor of which a first diode receives said input signal and of which a second diode constantly receives a series of clock pulses emitted so that several clock pulses be received during the rise of said input signal,
- a capacitor the first plate of which is connected to the resistor of said input circuit and with a capacitance suitable to present with the resistance of said resistor an integrating time constant determined with respect to the duration of one clock pulse,
- a threshold trigger-amplifier circuit including a first transistor with a load resistor, a tunnel diode parallel connected to the base and emitter of said transistor and a resistor element connected to determine a quiescent state in which the current flowing through said tunnel diode is lower than its typical peak current,
- and resistive coupling means arranged to couple the second plate of said capacitor to the base of said transistor, whereby said trigger-amplifier circuit is switched after a clock pulse only if said input signal reached a predetermined voltage level in the course of this clock pulse.

2. A circuit arrangement as set forth in claim 1, wherein said resistive coupling means comprises:
- another resistor with one extremity connected to the base of said transistor and one extremity connected to the second plate of said capacitor and,
- a diode the electrodes of which are respectively connected to the second plate of said capacitor and to a reference potential point, so that in the quiescent state, a portion of the diode tunnel current flows through said diode in the forward direction.

3. A circuit arrangement as set forth in claim 1, wherein said resistive coupling means comprises:
- a second amplifying transistor of the same type of conduction as said first transistor,
- a resistive element connected between the base of said first transistor and the collector of said second transistor and
- a further resistor for connecting a voltage source to the base of said second transistor to determine the base current intensity of the latter.

4. A circuit arrangement for generating a series of rhythmed output signals after detection of an input signal having a soft rising front edge and applied to an input terminal, comprising:
- an input logical circuit with diodes and resistor, of which a first diode receives said input signal and of which a second diode receives a continual series of clock pulses emitted so that several clock pulses are received during a front edge of said input signal,
- a capacitor the first plate of which is connected to the resistor of said logical circuit and having a capacitance suitable to present with the resistance of said resistor an integrating time constant determined with respect to the duration of one clock pulse,
- a threshold amplifier-trigger circuit including a first transistor with a collector resistor, a tunnel diode parallel connected to the base and emitter of said transistor and a resistor element connected to determine a quiescent state in which the current flowing through said tunnel diode is lower than its typical peak current,
- resistive coupling means arranged to connect the second plate of said capacitor to the base of said transistor so that the amplifier-trigger circuit delivers a control signal after a clock pulse only if said input signal reached a predetermined voltage level during this clock pulse,
- an output logical circuit with two input terminals and an output terminal, one input of which receives said clock pulses, and
- connecting means capable of polarity adaptation for coupling the output of said amplifier-trigger circuit to the second input terminal of said output logical circuit, whereby the clock pulses are available on the output terminal of the latter after the delivery of said control signal.

5. A circuit arrangement as set forth in claim 4, wherein said resistive coupling means comprises:
- another resistor with one extremity connected to the base of said transistor and one extremity connected to the second plate of said capacitor and
- a diode the electrodes of which are respectively connected to the second plate of said capacitor and to a reference potential point, so that in the quiescent state, a portion of the diode tunnel current flows through said diode in the forward direction.

6. A circuit arrangement as set forth in claim 4, wherein said resistive coupling means comprises:
- a second amplifying transistor of the same type of conduction as said first transistor,
- a resistive element connected between the base of said first transistor and the collector of said second transistor and
- a further resistor for connecting a voltage source to the base of said second transistor to determine the base current intensity of the latter.

7. A circuit arrangement for detecting an input signal having a soft rising front edge and applied to an input terminal, comprising:

an input logical circuit with at least two inputs and a resistor, the first input of which receives said input signal and a second input of which receives a sequence of clock pulses whose period is smaller than the duration of the front edge of said input signal, a capacitor with a plate connected to said resistor and having such a capacitance that the integrating circuit thus formed has a predetermined time constant, a threshold trigger circuit which has input and output terminals and is normally in a quiescent state and resistive coupling means for connecting the second plate of said capacitor to the input terminal of said trigger circuit, the arrangement being such that the output terminal of the latter delivers a characteristic signal after the front edge of an input signal has reached a predetermined magnitude during a clock pulse.

8. A circuit arrangement as set forth in claim 7, wherein said trigger circuit includes a first transistor with a load resistor, a tunnel diode parallel connected to the base and emitter of said transistor and resistor elements adapted to permit in a non-triggered state said tunnel diode to pass a current inferior to its typical peak intensity and to maintain said transistor non-conducting.

9. A circuit arrangement as set forth in claim 8, wherein said resistive coupling means comprises a diode and a further resistor series-connected in parallel with said resistor elements, and the junction between said diode and resistor being connected to the other plate of said capacitor.

10. A circuit arrangement as set forth in claim 8, wherein said resistive coupling means comprises a further transistor having its emitter connected to the cathode of said tunnel diode, its base connected to the other plate of said capacitor and its collector connected through a further resistor to the base of said first transistor, and base and collector resistors arranged to ensure the conduction of said further transistor in a quiescent state.

References Cited

UNITED STATES PATENTS

| | | | |
|---|---|---|---|
| 3,253,165 | 5/1966 | Cornish | 307—206 |
| 3,292,003 | 12/1966 | Sear et al. | 307—206 |

ARTHUR GAUSS, *Primary Examiner.*

S. T. KRAWCZEWICZ, *Assistant Examiner.*

U.S. Cl. X.R.

307—206, 258, 322